Aug. 5, 1969 G. E. REEDER, JR 3,459,086
SELF-SHARPENING SLITTER
Filed Oct. 21, 1966 4 Sheets-Sheet 1
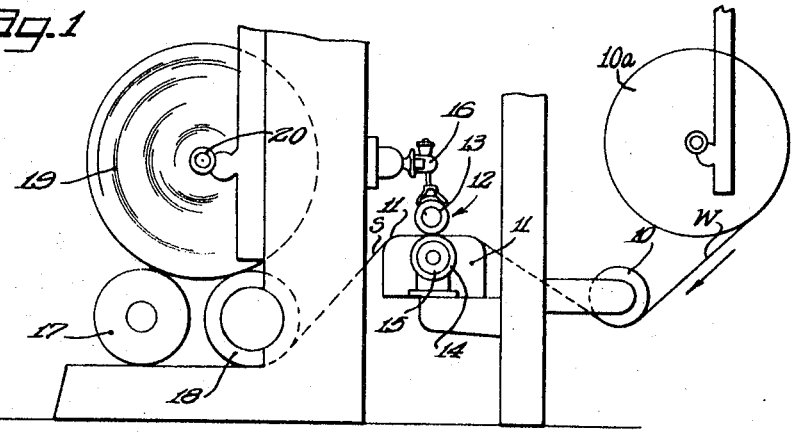
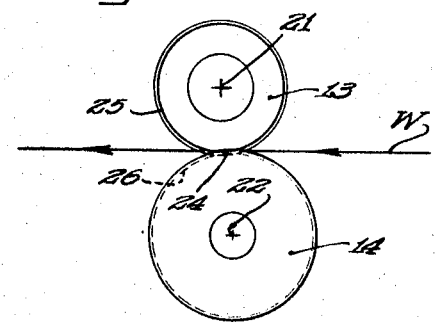
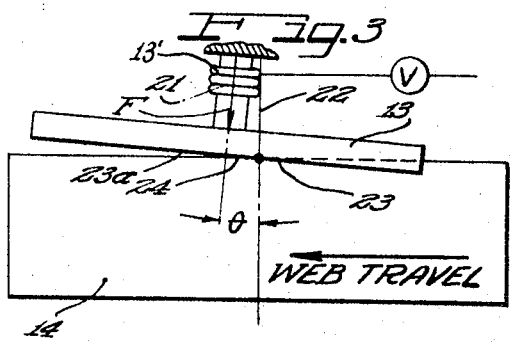
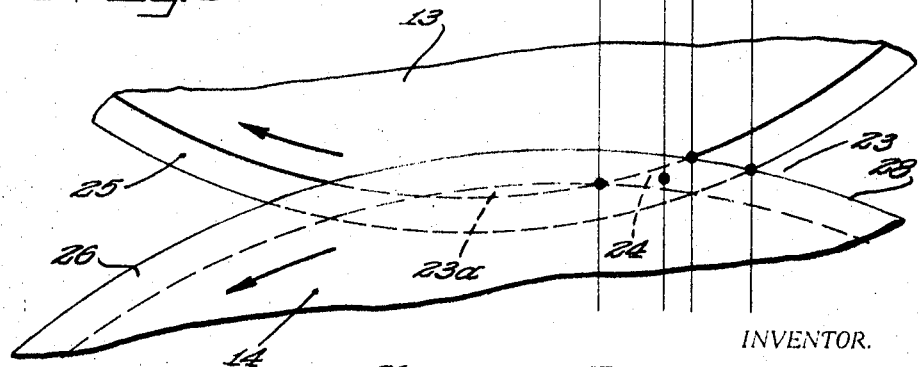
INVENTOR.
George E. Reeder, Jr.
BY Hill, Sherman, Meroni, Gross & Simpson
ATTORNEYS

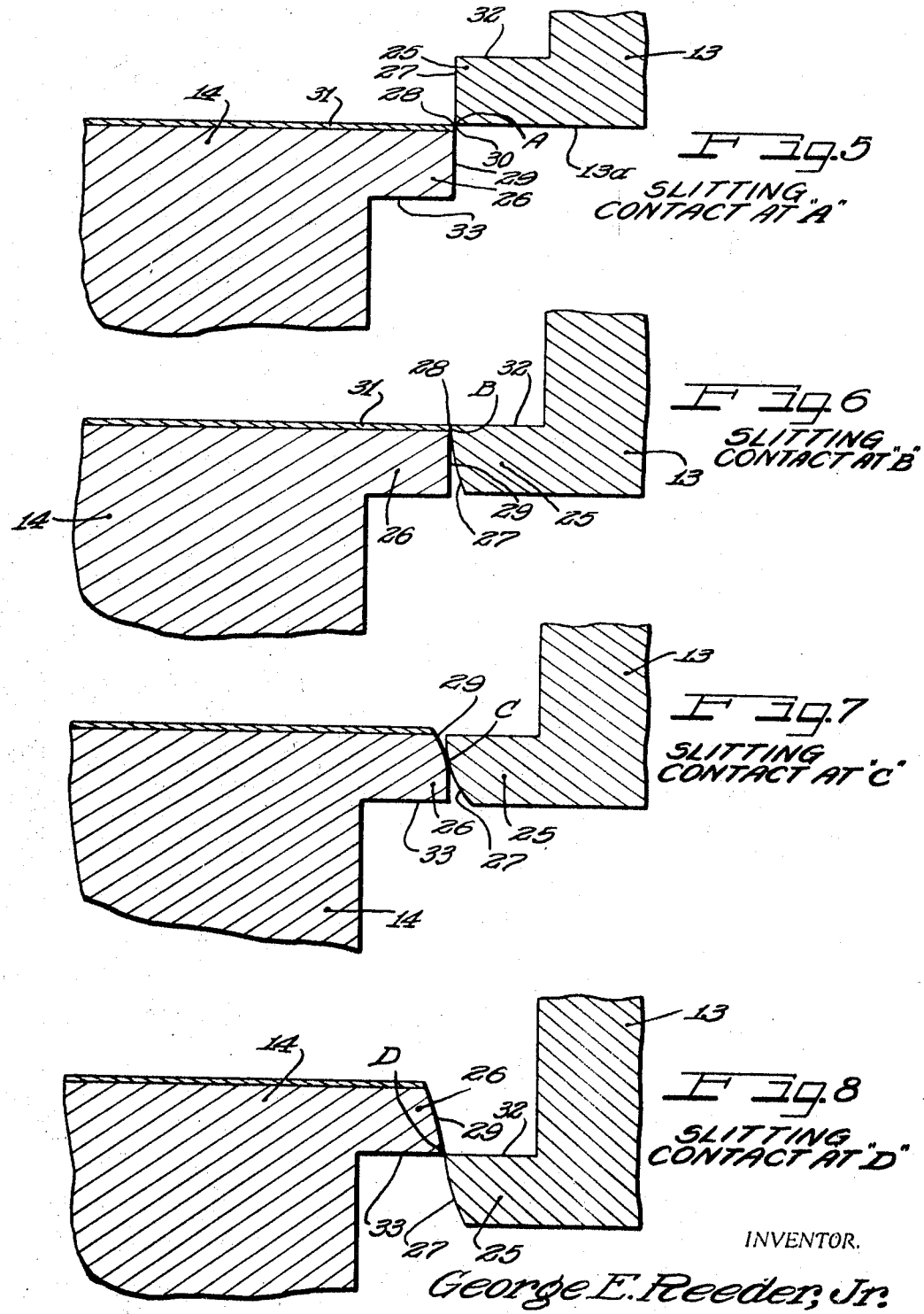

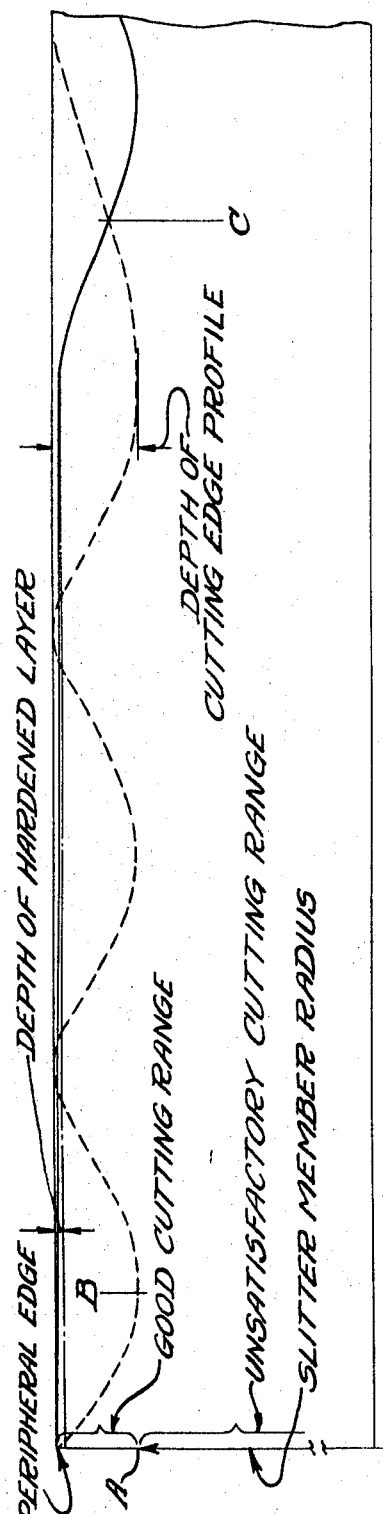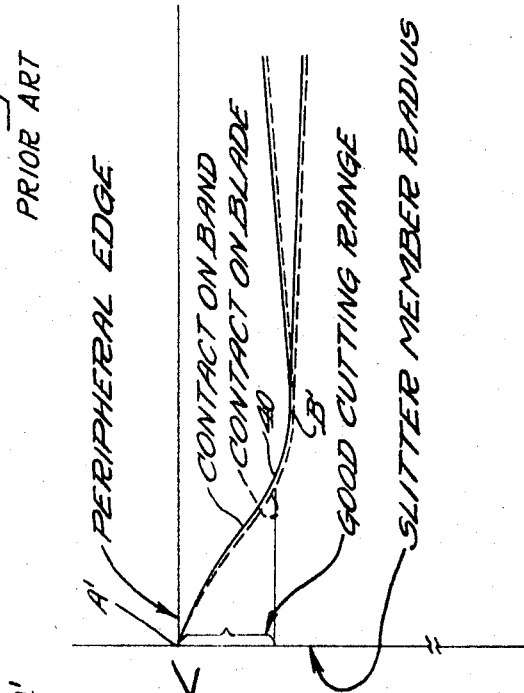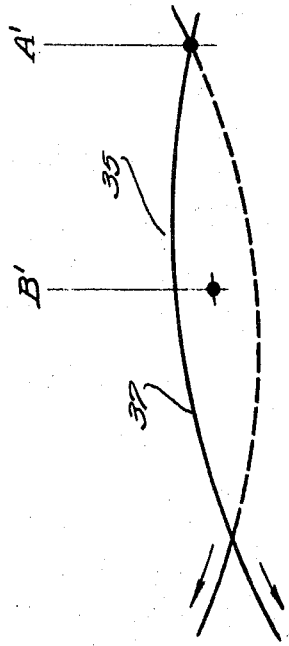

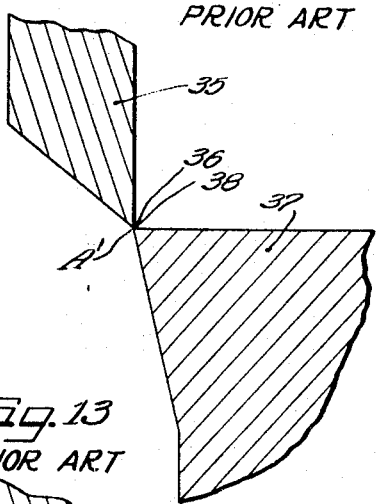
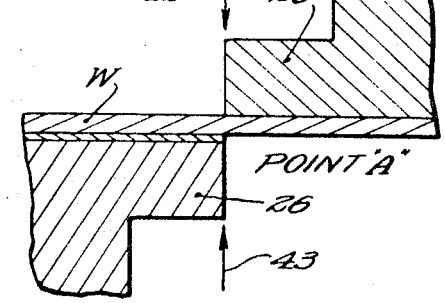
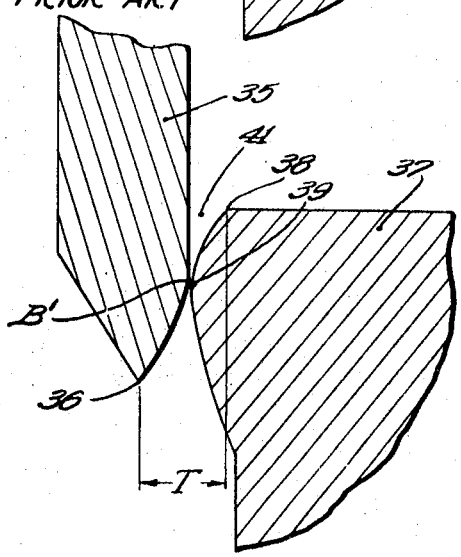
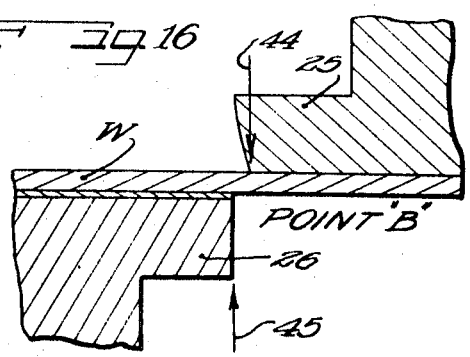
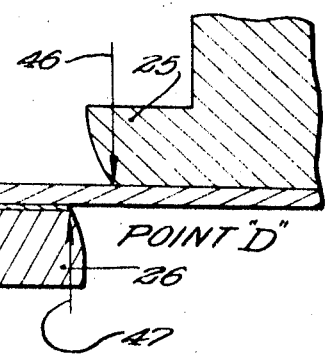
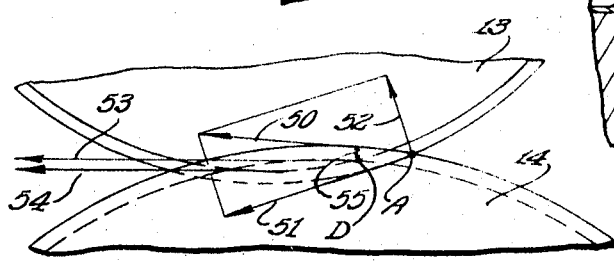

United States Patent Office 3,459,086
Patented Aug. 5, 1969

3,459,086
SELF-SHARPENING SLITTER
George E. Reeder, Jr., Newark, Del., assignor to Beloit
Eastern Corporation, Downingtown, Pa., a corporation
of Delaware
Continuation-in-part of application Ser. No. 584,734,
Oct. 6, 1966. This application Oct. 21, 1966, Ser.
No. 588,476
Int. Cl. B26d 7/06, 4/26
U.S. Cl. 83—425                                   15 Claims

ABSTRACT OF THE DISCLOSURE

A slitting mechanism for slitting a travelling web including a slitter band and a slitter blade having overlapping slitting edges in point contact with one another. The peripheral outer surface of the band is provided with a hardened outer layer so that the point contact will remain substantially at the outer periphery of the band for a large part of its wearing life.

---

This application is a continuation-in-part of my copending application filed Oct. 6, 1966, U.S. Ser No. 584,734. The present invention relates to the art of shearing materials and is particularly related to an improved slitter mechanism which is particularly advantageous in the continuous high-speed slitting of a travelling web.

Slitting apparatus of the general type to which the present invention relates is useful in a number of environments and the present invention has been found to be particularly well adapted to use in continuous slitting mechanism for slitting a travelling paper web or the like. The mechanism incorporates a rotating band and a rotating blade which overlap and coact to slit the web passing through the overlapping slitting zone at a relatively high speed. In a paper slitting mechanism a plurality of band and blade units are positioned at spaced locations across the web to form a number of slit strips. In an unwinder winder mechanism paper rolls of different types are placed on the machine and the web is unwound to pass the slitter mechanism and is again wound onto a roll.

A number of problems exist in maintaining uniform and satisfactory shearing operation at high operating speed. Web speeds on the order of six thousand feet per minute are normally anticipated and the slitting mechanism must operate by forming a smooth edge on the web which is not feathered or jagged. It is also highly desirable that the slitting mechanism be capable of operating continuously with infrequent sharpening or replacement of the slitter members to reduce operating cost due to shutdown and due to the expense of sharpening or replacement.

It is accordingly an object of the present invention to provide an inproved slitter arrangement which attains a unique self-sharpening feature capable of maintaining optimum and superior cutting operation over a long operating life without requiring sharpening and without dulling after long periods of wear.

It is a further object of the present invention to provide an improved slitter arrangement for severing travelling webs of paper and similar material which slits the web with a very smooth cut and does not degenerate in cutting ability during its operating life.

A still further object of the invention is to provide an improved cutting mechanism which operates in accordance with a new fundamental operational theory making it superior to other cutting devices heretofore available.

It is a still further feature of the present invention to provide a band and blade type slitter arrangement which is capable of functioning over a long operating life and which when worn requires replacement of only one of the members which can be constructed economically.

While the features and objectives of the invention are particularly well suited for use in a paper web slitter employing a shear band and blade, and will for convenience be described in this environment, it will be understood that the structural features of the unique slitter arrangement may in many circumstances be embodied in other types of cutting arrangements.

A feature of the invention is the provision of a coacting slitter band and blade each having an annular slitting edge of a predetermined radial depth, with the edges overlapping a depth equal to at least the sum of the radial depths of the band and blade, and being positioned at a shear angle so that in their coacting cutting zone the band and blade engage with point contact on the approach side of the zone and diverge on the trailing side of the zone, and with the band being provided with a hardened outer layer on the peripheral surface of the cutting edge so that the point contact will remain substantially at the outer edge of the band for the majority of its wearing life wherein migration of the cutting point to the inner side of the cutting edge will constitute only relatively short periods of its operating life obtaining a uniquely superior cutting quality and startlingly long operating life.

Other object, advantages and features will become more apparent with the teaching of the principles of the present invention in connection with the disclosure of the preferred embodiments thereof in the specification, claims and drawings, in which:

FIGURE 1 is a side elevational view shown somewhat schematically in form of a winder unwinder operation embodying a web slitter;

FIGURE 2 is an enlarged side elevational view of the band and blade of the slitter illustrating their coaction to slit a travelling web;

FIGURE 3 is an enlarged top plan view of FIGURE 2;

FIGURE 4 is a greatly enlarged fragmentary view illustrating the cutting zone between the slitter members;

FIGURES 5 through 8 are greatly enlarged vertical sectional views taken along the lines shown at A, B, C and D of FIGURE 4;

FIGURE 9 is a graph illustrating the migration of the cutting point for the blade and band cutting members over a long period of slitting operation;

FIGURE 10 is a fragmentary side elevational view illustrating the cutting zone of a conventional band and blade mechanism of the type heretofore available;

FIGURE 11 is a graph illustrating the location of the cutting area of the structure of FIGURE 10;

FIGURES 12 and 13 are enlarged vertical fragmentary sectional views taken along the lines A' and B' of FIGURE 10;

FIGURE 14 is a diagrammatic view illustrating certain force vectors occurring between a cutting band and a cutting blade; and FIGURES 15 through 17 are enlarged schematic vertical sectional views taken through the plane of a travelling web parallel to the axis of a cutting band and blade showing the effect of wear on the cutting action of a band and blade.

On the drawings:

An unwinder winder mechanism for slitting a web of paper is shown in FIGURE 1 wherein a web w is received from a source such as an unwinding roll 10a and passes over a guide roll 10. The web passes through a slitter mechanism 12, being supported in part on guide surfaces 11 as it comes into and leaves the slitter 12. The strips S of the slit web are then wound onto a roll 19 which is supported on winding drums 17 and 18, being wound on a core 20. The web passes over the drum 18 as it is being wound onto the roll 19.

The slitter mechanism 12 includes an upper slitting blade 13 and a lower slitting band 14. A plurality of these slitters 12 are arranged across the machine at desired spaced intervals to slit the web into as many strips as necessary. In the arrangement shown the band 14 is driven in rotation by a motor 15 and the blade 13 is suitably rotatably mounted to be driven through engagement with the band.

The blade 13 is mounted on an overhead support 16 which permits vertical adjustment of the blade 13 and permits turning it about a vertical axis so as to change the slitting angle, as will be explained in connection with FIGURE 3.

As shown in FIGURE 2, the blade 13 and band 14 are arranged to overlap in a cutting zone 24 and thereby slit the travelling web w passing into the cutting zone. The blade 13 rotates on an axis 21 and the band 14 on an axis 22 which are substantially horizontal and parallel to each other in the horizontal plane. The axes 21 and 22 are however tilted or canted by a shear angle $\theta$, FIGURE 3. The shear angle is relatively small and is preferably set at a minimum angle sufficient to permit engagement between the blade 13 and band 14 on the approach side 23 of the cutting zone 24, and cause divergence of the blade and band on the off-running side 23a of the cutting zone 24. A shear angle $\theta$ of 55 minutes has been found quite satisfactory for various grades of fine paper and relatively high running speeds on the order of 6000 feet per minute. For some web materials a larger shear angle may be employed although increased shear angle increases the tendency of the blade to climb onto the outer peripheral surface of the band 14 and a minimum shear angle in excess of 0 degrees, and substantially on the order of 1 degree is desirable.

The band 14 is relatively axially wide compared to the blade 13 and as so constructed provides a support for the travelling web w. In the present construction as the web is slit, the blade 13 does not penetrate down through the web to extend below the slit portion as has been the action with slitter structures of the type heretofore available. This contributes to an improved slitting action and the reduction of bending or distortion of the slit edge of the web.

In accordance with the present invention, the blade 13 and band 14 have projecting cutting edges 25 and 26 which may be termed profiles or ribs at the outer edge. While the cutting edges 25 and 26 have radial depths, this depth is relatively small so that the ribs may be conveniently termed edges. These edges 25 and 26 are shown in enlarged detail in FIGURES 5 through 8 which illustrate the coaction between the edges over a period of wear time.

The cutting edge 25 of the blade 13 has a radial surface 27 with an outer peripheral edge 28. The cutting edge 25 may be formed to be carried on the body of the blade 13 by different manufacturing procedures, such as by machining a recess radially inwardly from the outer peripheral edge of the blade to form the shoulder 32 which faces radially inwardly. The blade may be stamped, or may be dish shaped so that the annular cutting edge profile 25 is formed at the outer edge of the blade to face the cutting edge profile 26 of the band 14.

The profile 26 of the band may be formed by machining the band radially inwardly of the outer edge to form the shoulder 23, or the profile may be formed by being attached to the band such as by shrinking an annular ring onto the band body. It will also be understood while the cutting members 13 and 14 are shown in a preferred form, in some installations it may be desirable to make the band considerably thinner in an axial direction and this disclosure is not using the terms band and blade as words of limitation but merely for descriptive purposes. Similarly while the upper and lower positional relationship are advantageous for functioning in a paper web slitter, the positional relationships are not to be taken as terms of limitation but of description only to indicate a preferred form.

The cutting edge profile 26 of the band has a radial outer surface 29 which faces the radial surface 27 of the blade, and the surface 29 at its outer periphery terminates in an edge 30.

An important feature of the invention is the provision of a relatively thin hardened outer peripheral surface layer 31 on the band. While hardened layers have heretofore been utilized in cutting tools, the coaction of this hardened outer layer with the other elements of the cutting or slitting combination provide a unique coaction which achieves an unexpectedly continuing excellency of slitting function with an unexpected long wearing life.

I have discovered that this structure provides the advantages of an excellent cut in long wearing life, and my theory of the coaction which achieves these objectives, but by which I do not necessarily wish to be completely bound, may be explained in connection with FIGURES 4 through 9.

Due to the setting of the band and blade so that they have a shear angle, they engage in point contact. To maintain the shearing coaction and uphold this point contact an axial pressure indicated by the arrow F in FIGURE 3, is applied to the blade. This may be applied by various mechanical means such as by an adjustable valve controlled pressure air cylinder on the blade mount as indicated diagrammatically at reference numeral 13′. I have found that with the present arrangement lower axial blade pressure forces may be applied than heretofore conventionally used. It has been a belief of the art heretofore that relatively high blade pressures were necessary to achieve slitting, and these high blade pressures were indeed necessary with wear to maintain cutting contact. In many prior installations axial blade pressures have been applied which obtain either line or surface contact between the blade and band resulting in the generation of excessive heat and wear. With my structure a blade pressure should be applied merely sufficient to obtain point contact and to prevent separation of the blade and band. This will vary with the type of paper being slit and the speed of operation. For example with lightweight tissue a very low contact pressure is necessary, with this pressure successively being increased for the slitting of fine paper, kraft paper and board. An axial blade pressure of three and one-half pounds has been found quite satisfactory for a multiplicity of uses although lighter weight pressures can be employed.

As shown in FIGURE 4, as the paper web enters the cutting zone 24 it is cut at the contact point A. The outer peripheral surface 13a, FIGURE 5, rides on top of the paper web and does not penetrate it. In devices of the type heretofore available, such as illustrated in FIGURE 12, it was thought necessary to have the blade completely penetrate the paper web with the cutting being accomplished by a sharp peripheral outer edge 36 of the upper blade 35 as it coacted with a band 37.

As slitting begins, over a period of operation wear will occur with the radial surface 27 of the blade 13 wearing at a more rapid rate since it is of a material softer than the outer peripheral edge of the band formed by the surface material 31. As this occurs the point of engagement relative to the band will continue to be at the outer peripheral edge 28 of the cutting edge profile 26. The point of contact relative to the blade however will travel or migrate down to the inner edge 32 of the blade until the point contact is at B in FIGURE 4. This condition is illustrated in FIGURE 6. It will be observed that the travelling web will still be cut at the very outer peripheral edge of the band 14 thus avoiding any bending or tearing of the edge of the web as it comes into the slitting zone. Such bending and tearing is the cause of an imperfect and ragged edge on the web and is also the cause of the formation of dust which is particularly undesirable in printing papers and lithograph papers.

As the wear life of the blade and band continue, the surface 27 of the cutting edge profile 25 will continue to wear with the point of engagement travelling or migrating radially in and out along the surface 27. Eventually after a number of wear point migrations radially back and forth along the surface 27, the very hard material 31 will wear sufficiently so that the point engagement against the cutting edge 26 travels below the hardened material 31 onto the softer supporting material. This situation is shown in FIGURE 7 with the point of contact being illustrated at C in FIGURE 4.

While the point of contact on each of the surfaces 27 and 29 of cutting edge profiles 25 and 26 move radially inwardly and outwardly independent of each other, it is possible that at some time in the wear life the point of contact will occur at the innermost radial edges 32 and 33 of both the band and blade as illustrated in FIGURE 8. However, even at this condition (which occurs only for a short period of time since the point of contact will again begin to migrate outwardly relative to both slitting members 13 and 14) the cutting location will still be within the good cutting range as will be illustrated by the graph of FIGURE 9. In other words it is essential to good cutting that the point of engagement be very close to the outer periphery of both the band and blade. When this point of engagement is some distance inwardly from the outer peripheral surfaces of both the band and blade the point reaches the unsatisfactory cutting range. This "unsatisfactory cutting range" is the location where the major time of operation of slitters heretofore available occurred.

As shown in FIGURE 9, the unbroken line shows the point of contact between the slitter members 13 and 14 on the band 14. The contact point stays at the outer edge of the band for over a substantially long period of wear time.

The broken line shows the point of slitting contact on the blade and as will be noticed this travels radially in and out along the surface 27 of the cutting edge profile 25 of the blade and of course can never travel inwardly further than the inner surface 32 which is within the good cutting range. The graph shows successive points A, B, and C which may be corresponded to these points of cutting engagement in FIGURE 4, and in FIGURES 5, 6 and 7 successively.

The cutting point of engagement on the band will remain within the depth of the hardened layer for a long period of time, and then will travel inwardly to the inner surface 33 briefly and then again travel outwardly to remain at the outer peripheral edge for another long period of time. While theoretically the slitting should not be quite as good when the cutting point on the band travels downwardly as is shown to the right of the graph in FIGURE 9, this location is still so close to the outer peripheral edge and is within the good cutting range so that a change in product is imperceptible for practical purposes.

It will be understood that the wear time indicated on the graph in FIGURE 9 represents only a very small portion of the total wear life of the blade and band. The blade will of course wear out first in the arrangement illustrated but can be easily replaced. The blade can be used until the entire depth of the profile 25 is worn off of the blade.

It is preferred that the radial depth of the cutting edge profiles 25 and 26 be as small as possible and the depth chosen usually is that which is required to provide an adequate support for the hardened outer layer 31 of the band. A profile depth of .025 inch has been found quite satisfactory for the slitting of paper webs of various grades and thicknesses. The axial depth of the cutting edge profiles, that is the depth of the surfaces 32 and 33 should also be chosen as deep as possible while providing stable concentric support, and an axial profile depth of .070 inch has been found quite satisfactory. With these dimensions a hardened outer surface layer 31 of .002 inch has been quite satisfactory. For practical usage a radial slitting edge profile of not greater than .050 inch with an axial depth of approximately 3 to 4 times the radial depth should be maintained. While these recommended dimensions are not by way of limitation, the guiding factor generally is to provide a radially thin cutting edge profile of sufficient depth to be sufficiently rigid for handling and installation but maintaining the radial profile depth as small as possible.

In prior devices employing a conventional band and blade such as illustrated in U.S. Patent 3,143,024 it has heretofore been impossible to maintain point contact for any longer than a very short wearing life and the major part of the slitting life occurs radially inwardly of the good cutting range.

FIGURE 10 illustrates a cutting band 37 with a cutting blade 35 of the type heretofore available as shown by way of example in the aforementioned Patent 3,143,024. The blade and band overlap in a cutting zone and are positioned with a shear angle so that at the beginning of operation point contact occurs at A'. With wear this point of contact moves radially inwardly along both the blade and band until it reaches a point B' midway between the two outer peripheral surfaces of the blade 35 and band 37. For a short time during the beginning of operation this point contact effects satisfactory cutting since the relationship exists illustrated in FIGURE 12. However as the point of contact moves radially inwardly, as illustrated in FIGURE 11, it passes the good cutting range and at location 40 moves into an unsatisfactory cutting range. At point B' the point of engagement cannot migrate further inwardly with respect to either of the cutting members 35 and 37, and then the point contact broadens to become a surface contact of wider area as shown by the diverging lines in the graph in FIGURE 11 which indicate the location of the edges of the surface contact. When this surface becomes so broad that the edges cut become intolerably rough, the blade must be removed and sharpened to renew the sharp pointed edge as shown at 36 in FIGURE 12.

When the slitting occurs at point 39, as shown at B' in FIGURES 11 and 13, a significant reason why cutting is unsatisfactory is due to the folding which the edge of the paper must encounter to be drawn down into the cutting location. The edge of the paper tends to be folded or drawn down into the depth of the throat 41 between the cutting members 35 and 37. As the web approaches the cutting members, it is first engaged by the tip 36 of the blade 35 and by the tip 38 of the band 37. These tips are spaced laterally apart a distance T. The web is folded by the pressures applied at the spaced points 36 and 38 until it is severed at the location 39.

With the instant invention, the throat or folding width of the cutting members never reaches the wide proportions that it does with prior structures.

FIGURES 15 through 17 illustrate a web w, in greatly enlarged sectional view, and the points at which it is engaged by the cutting edge profiles 25 and 26 of the blade and band 13 and 14 of the present invention. FIGURE 15 illustrates the relationship between the web and the cutting profiles 25 and 26 when the cutting point is at A in FIGURES 4, 5 and 9. The force arrows 42 and 43 are directly in line so there is no bending force applied to the web w.

When the wearing point advances to point B, the condition exists that is shown in FIGURE 16, and when the cutting edge profiles 25 and 26 first engage the paper, 44 and 45 are only slightly spread.

When the wear point advances to point C, as shown in FIGURES 4 and 7, the force arrows 46 and 47 are spread only slightly further. Even when the wear point is at location D, the forces on the web as it is first engaged are relatively narrower than the distance T shown in FIGURE 13. Therefore, the folding and tearing effect on the web is greatly reduced. The tearing effect which tends to separate the fibers by lateral force rather than by cutting is the major cause of the creation of dust. This has been avoided by the present invention, and separation is due to clean cutting or slitting rather than tearing.

FIGURE 14 illustrates the relative forces between the slitter members which cause wear between the cutting profiles. The resultant force of the band 14, when the engagement is at point A, is along force vector 50 which is tangential to the band 14. The resultant force of the blade 13 on the band is along force vector 51, which is tangential to the blade. Summing the vectors 50 and 51 with respect to the resultant wear force vector on the blade, results in the vector 52 which is substantially normal to the blade. It will be understood that the actual wear vector is not exactly normal to the blade since other factors enter in, including slippage between the band and blade forces which create metal deformation and heat and the like; but for the purposes of discussion, the vector 52 may be assumed to be radial.

As the contact or slitting point moves down to location D, the force vectors remain substantially the same in size, as shown by vectors 53 and 54, but their direction changes relatively so that the resultant wear vector 55 is considerably shorter. Thus, wear will proceed somewhat more slowly at the contact points when they are closer to the center of each of the slitter members 13 and 14. This explains the flatter slope of the broken line curve of FIGURE 9 when the contact point is further inwardly from the outer peripheral edge of the cutting edge.

It is recognized that hardened outer surfaces have been used heretofore on slitter structures, such as in U.S. patent, No. 3,122,958. While structures such as shown in this patent extend the wearing life of conventional slitters, they generally will result in the same coaction as explained above in connection with FIGURES 10 through 13.

While the features of the present invention have been described as employed in a web slitter, and preferably with a paper web slitter, it will be recognized that the features may be adapted in slitters of other structures. The principles of the invention may be employed in any slitter embodying first and second slitter members, each having a slitting head and each adapted for movement about a slitting axis with the edges having a predetermined depth in the direction of relative movement and being urged together with a predetermined pressure normal to the edges to have point engagement in the slitting zone, and wherein they move together a distance at least as great as the combined depths of their edges, with at least one of the slitter members having a hardened leading surface at the slitting edge so that point engagement will occur at this lead edge for a large part of its wearing life. As will be appreciated from the foregoing description, the slitter members should have a minimum overlap with the overlap equaling at least the sum of the depths of the two slitting edges.

The hardened layer or leading edge may be formed of various material such as having a coating of tungsten carbide or aluminum oxide which may be applied as by a flame coating process. Other hardened layers may be embodied such as by applying a special hardening process to the outer surface of the material of the band. In some instances, it may be desirable to form the outer layer separately from the band and to shrink-fit it in place with a machining or grinding of the outer surface to obtain concentricity.

While the preferred arrangement is shown and described, it is contemplated that in some select instances, the entire cutting edge or profile of the band may be of hardened material. It is also contemplated that the cutting edge profile of the band may be made entirely of a softer material and the hardened outer surface be incorporated on the blade instead of the band.

As an example of a structure successfully embodying the principles of the invention, the following unit has been operated with the wearing life exceeding by ten times the wearing life of a conventional construction and indicating only superficial wear with a promise of an exceptionally long wearing life:

A 10½ inch diameter band with an 8 inch diameter blade, with a blade thickness of .020 inch, a band cutting edge profile axial depth of .090 and a blade cutting edge profile axial depth of .070, the profiles each at a radial thickness of .025 with the band having an overall thickness of 2 inches.

With this structure, 40 lb., 50 lb. and 60 lb. coated and supercalendered papers were slit over long successful runs, and 80 lb. and 90 lb. lithograph paper, which is a very tough paper, was run. This was done with 3½ lbs. of blade pressure and with the band driven to drive the blade through contact. The band was driven ten percent faster than the web traveled, and the wear gave indications of a life expectancy of hundreds of thousands of hours. A zero degree fifty-five minute shear angle was employed with a penetration overlap of .054 inch. Under these circumstances, point slitting engagement was maintained between the blade and band and the point of shearing contact traveled in the manner generally indicated by FIGURE 9.

Thus, it will be seen that I have provided an improved and unique cutting mechanism structure which meets the objectives and advantages above set forth. The structure provides a marked advance in the development of the art in that it achieves improved slitting at the same or higher speeds as heretofore possible with a smoother edge and with the elimination of dust, and is capable of continuing this improved slitting over a wearing life far exceeding any heretofore thought possible. The structure is not expensive as compared with devices heretofore used and effects a great saving in avoiding the necessity of shutdown and replacement or resharpening of blades and permits continued operation of the slitter in various environments and is particularly useful in paper web slitting systems, wherein the slitter can be run continuously with the unwinding of successive paper rolls. Yet, the structure is not limited to rotary slitters for webs; but the principles may be embodied in other types of cutters, as above described.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. In a slitter mechanism for slitting a travelling web, the combination comprising,
   a slitter band having an annular slitting edge of a predetermined radial depth,
   a slitter blade having an annular slitting edge of a predetermined radial depth,
     said blade and band positioned so that their slitting edges overlap in a slitting zone for a radial depth at least as great as the combined depth of said radial depths of the band and blade,
   the axis of the band and blade positioned to have a shear angle so that the slitting edges engage on the approach side of the slitting zone and diverge on the trailing side of the slitting zone,
     said band and blade being held axially in cutting engagement with a predetermined axial force sufficient to provide no more than point contact between said slitting edges,
   and a hardened outer layer upon the peripheral outer surface of the band so that said point contact will remain substantially at the outer periphery of the band for a large part of its wearing life.

2. In a slitter mechanism for slitting a travelling web the combination in accordance with claim 1 wherein said shear angle is greater than zero degrees (0°) and only sufficiently large enough to prevent the blade from crossing over onto the band in said slitting zone at the operating speed of rotation of the band and blade.

3. In a shear mechanism for cutting material the combination comprising,
a first slitter member having a slitting edge and adapted for movement about an axis,
a second slitter member having a slitting edge and adapted for movement about an axis with said edges relatively moving together and urged together with a predetermined presssure normal to the edges to have point engagement in a slitting zone,
said edges having a predetermined depth in the direction of a relative movement and moving together a distance at least as great as the combined depths of their edges,
the axes of said members positioned relatively so that said edges diverge in one direction away from the cutting zone, and
a hardened material on one member at the lead of its edge so that said point engagement will occur at the material on said one member for a large part of its wearing life.

4. In a shear mechanism for cutting material, the combination of claim 3 wherein the cutting edge of each of the members is annular and concentric with the axis of its cutting member.

5. In a slitting mechanism for slitting a travelling web in accordance with claim 1 wherein the band is axially broader than the blade and is positioned below the blade with its outer surface supporting the travelling web.

6. In a slitting mechanism for slitting a travelling web in accordance with claim 1 wherein the outer periphery of the blade member does not penetrate the web but remains on the surface which it faces as the slitting edge approaches the surface of the web.

7. In a slitter mechanism for slitting a travelling web in accordance with claim 1 wherein the cutting edge of the blade is softer than the hardened outer layer of the band.

8. In a slitter mechanism for slitting a travelling web in accordance with claim 1 wherein at least one of said cutting edges is formed by a recess radially inwardly of said edge.

9. In a slitter mechanism for slitting a travelling web in accordance with claim 1 the combination including means for driving the band in rotation as the web moves forwardly through the cutting zone with the blade being driven by frictional engagement with the band at said point of contact.

10. In a slitter mechanism for slitting a travelling web in accordance with claim 1 wherein the thickness of the hardened layer on the band relative to the supporting material of the cutting edge is thinner than the supporting material and is of a thickness such that the point of contact remains at said layer for the greater portion of the total wear life.

11. In a web slitting mechanism,
a blade for use with a band having an annular slitting edge of a predetermined radial depth and having a hardened outer layer on the peripheral outer surface,
said blade comprising a circular member adapted for rotation about an axis and having an annular slitting edge of a predetermined radial depth adapted for being positioned with its axis at a shear angle relative to the band with its slitting edge engaging the slitting edge of the band at point contact so that the slitting edges engage on the approach side of a slitting zone where they overlap and diverge on the trailing side of the zone and overlap a radial depth at least as great as the combined depths of the radial depth of the slitting edge of the band and blade.

12. In a web slitting mechanism,
a band for use with a blade having an annular slitting edge of a predetermined radial depth,
the slitter band comprising a circular member having an annular slitting edge of a predetermined radial depth,
and a hardened outer layer on the peripheral outer surface of the band at the outer side of said edge,
the band adapted to engage with the blade in a slitting zone and be positioned with its axis to form a shear angle with the blade so that the slitting edges engage on the approach side of the slitting zone and diverge on the trailing side of the zone and overlap in the slitting zone a depth at least as great as the combined depths of the slitting edges of the band and blade so that the band and blade will engage in point contact which will remain substantially at the outer peripheral edge of the band for a large part of its wearing life.

13. In a slitter mechanism for slitting a travelling web in accordance with claim 1, the combination including means for varying the axial pressure between the band and blade for obtaining said point contact and accommodating variations in thickness of web material being slit.

14. The slitter mechanism as defined in claim 9 and including
means for supplying an unwinding travelling web to said slitting mechanism,
means for receiving said travelling web from said slitting mechanism and for winding said web into a roll.

15. In a slitter mechanism for slitting a travelling web, the combination comprising,
a slitter band having an annular slitting edge of a predetermined radial depth, and
a slitter blade having an annular slitting edge of a predetermined radial depth,
said blade and band positioned so that their slitting edges overlap in a slitting zone for a radial depth at least as great as the combined depth of said radial depths of the band and blade,
the axis of the band and blade positioned to have a shear angle so that the slitting edges engage on the approach side of the slitting zone and diverge on the trailing side of the slitting zone,
said band and blade being held axially in cutting engagement with a predetermined axial force sufficient to provide no more than point contact between said slitting edges.

References Cited

UNITED STATES PATENTS

| 559,176 | 4/1896 | Koegel | 84—497 |
| 1,673,336 | 6/1928 | Lehmicke | 83—501 X |
| 3,122,958 | 3/1964 | Washburn | 83—500 |
| 3,143,024 | 8/1964 | Markowski | 83—497 |
| 3,173,326 | 3/1965 | Gulliksen et al. | 83—501 |
| 3,176,566 | 4/1965 | Patterson | 83—502 |

WILLIAM S. LAWSON, Primary Examiner

U.S. Cl. X.R.

83—496, 502, 503, 675